United States Patent
O'Brien (10) Patent No.: US 8,380,808 B2
(45) Date of Patent: Feb. 19, 2013

(54) DYNAMIC MEDIUM CONTENT STREAMING SYSTEM

(76) Inventor: Royal O'Brien, Jacksonville, FL (US)

(*) Notice: Subject to any disclaimer, the term of this patent is extended or adjusted under 35 U.S.C. 154(b) by 1120 days.

(21) Appl. No.: 12/276,998

(22) Filed: Nov. 24, 2008

(65) Prior Publication Data

US 2010/0131994 A1 May 27, 2010

(51) Int. Cl.
*G06F 15/16* (2006.01)
(52) U.S. Cl. .......................... 709/217; 709/231
(58) Field of Classification Search ................ 709/217, 709/219, 231, 243–244
See application file for complete search history.

(56) References Cited

U.S. PATENT DOCUMENTS

| | | | | |
|---|---|---|---|---|
| 7,636,946 B2* | 12/2009 | Verma et al. | | 726/24 |
| 2005/0044353 A1* | 2/2005 | Pudipeddi et al. | | 713/155 |
| 2006/0101476 A1* | 5/2006 | Robert | | 719/328 |
| 2007/0110044 A1* | 5/2007 | Barnes et al. | | 370/360 |
| 2007/0266032 A1* | 11/2007 | Blumenau | | 707/10 |
| 2008/0040404 A1* | 2/2008 | Christiansen et al. | | 707/205 |
| 2008/0075285 A1* | 3/2008 | Poli et al. | | 380/211 |
| 2008/0115177 A1* | 5/2008 | Kim et al. | | 725/90 |
| 2009/0150918 A1* | 6/2009 | Wu et al. | | 725/9 |
| 2009/0241144 A1* | 9/2009 | LaJoie et al. | | 725/40 |
| 2010/0023582 A1* | 1/2010 | Pedersen et al. | | 709/203 |
| 2010/0031274 A1* | 2/2010 | Sim-Tang | | 719/318 |

* cited by examiner

*Primary Examiner* — Patrice Winder
*Assistant Examiner* — Ebrahim Golabbakhsh
(74) *Attorney, Agent, or Firm* — Mark Young, P.A.

(57) ABSTRACT

A streaming on demand system includes an on-demand requester object installed on a computing device. The on-demand requester object is configured to receive I/O requests for an application for which data is available in data packs for streaming delivery. The on-demand requester object includes a minifilter associated with a filter manager in an I/O stack. The minifilter receives each I/O request from the application, references a table that includes at least one address where each data pack required to fulfill each I/O request is located, and determines if the data pack has been streamed to the system. The table may also include a size indicator for each data pack. The minifilter loads before compression and filter minifilter drivers in the I/O stack. The minifilter attaches to the I/O stack by registering with a filter manager in the I/O stack for I/O requests for the application for which data is available in data packs for streaming delivery. The minifilter passes on a read call if a required data pack is available locally and if all data in the required data pack has been received. The minifilter withholds a read call if a required data pack is not available locally or if all data in the required data pack has not been received. If an I/O request is a write operation, the minifilter writes an address and size indicator corresponding to the write operation to the table. If the I/O request is a create operation, the minifilter attaches extended data to a file stream.

20 Claims, 5 Drawing Sheets

DYNAMIC MEDIUM CONTENT STREAMING SYSTEM

FIELD OF THE INVENTION

This invention generally relates to streaming software, and, more particularly, to a system and method that uses an inline service hook modifier to manage delivery of software from a delivery source, in separate executable portions.

BACKGROUND

Traditional methods of delivering software applications to users are inadequate to satisfy the needs and demands of today's enterprises and consumers. Delivery via tangible media (e.g., CDs and DVDs) is slow and inefficient, incurring significant production and distribution costs, occupying retail and warehouse shelf space, requiring substantial packaging, and consuming considerable time in delivery. Full-program downloads require inordinate amounts of time before a user may commence use. Server-based/thin-client computing does not provide a full PC user experience.

Software streaming provides advantages with reduced cost advantages of centralized streaming servers and local execution of programs that are delivered on-demand. Game developers may use streamed software to increase revenue and customer loyalty by offering titles worldwide over the Internet for purchase, rental or trial, all with anti-piracy protection and an optimum game-play experience. Software streaming also creates new revenue opportunities for software vendors, portals and ISPs who can use it to create software-on-demand and managed services.

Available software streaming systems and methods involve preprocessing that entails separating a program into small manageable packages that are stored on a server. The packages are downloaded as needed by the program being streamed. The client executes a program that helps manage the process by sending requests to a server for packages as they are needed.

Illustratively, U.S. Pat. No. 6,453,334, to Vinson, et al., describes a system for allowing only needed components of a remotely located target program to be executed on a local computer. Using the system described in Vinson, et al., only those portions of the program or data actually used are downloaded. Files of a program are broken into compressed, encrypted chunks in a preprocessing phase. This accomplished by opening the file, reading a block of chunk-size bytes, encrypting the block, compressing the block, calculating a unique file name for the block from the unique ID of the file and the block number, writing the just processed block to a new file in the specified directory of the runtime server using the file name previously generated, and then repeating for the next block in the input file until the end of file is reached. Thus, chunks are formed sequentially, one after another, comprising contiguous portions of the executable program. An index contains the information used by a client-side file system driver (FSD) to compute which chunk to download at runtime as it is needed. The FSD also creates a virtual drive, complete with drive letter, and places each target program that is to be accessed under a top-level directory on that virtual drive. Access to a chunk of a remote target program that has not been downloaded to the client machine may be granted or not depending on the type of access being requested (i.e. which volume or file function is being executed), an ID of a process attempting access, and optionally the path specified in the request for those requests containing paths.

While known software streaming systems and methods are useful for their intended purpose, namely managing the secure delivery of needed portions of a program, they still suffer shortcomings. There are many problems associated with streaming software that it would be advantageous to negate, work around, or reduce. For example, speeding up execution of streaming programs is an on-going issue. As another example, streaming to devices that occasionally lose a connection has not been satisfactorily addressed. As another example, it may be desirable to provide a user with an experience similar to that associated with an installed, as opposed to streamed, program. As another example, it may be desirable to provide streamed programs on consoles and mobile devices.

One key problem in particular relates to modern operating systems and security software which limit, impede or reject virtual drives and file system drivers. Such devices are perceived as security risks. Additionally, file system drivers must accommodate all I/O commands for all supported hardware. Not only is a substantial volume of hardware supported, but such drivers are frequently updated. Due to difficulties of making a substitute file system driver complete and maintaining the driver with all updates, such an approach is disfavored. Incompleteness and obsolescence of data contained in substitute file system drivers results in crashes.

Another key shortcoming of such systems and methods is an inability to prioritize delivery of components to expedite execution. Various instances may require different portions of a segmented program at different times. Existing systems do not optimize the creation of deliverable packages or facilitate the delivery of packages when needed.

What is needed is a system and method that allows streaming delivery of program components from a source such as a networked server or tangible medium without creating a virtual drive or file system driver. The invention is directed to overcoming one or more of the problems and solving one or more of the needs as set forth above.

SUMMARY OF THE INVENTION

To solve one or more of the problems set forth above, an exemplary streaming on demand system includes an on-demand requester object installed on a computing device. The on-demand requester object is configured to receive I/O requests for an application for which data is available in data packs for streaming delivery. The on-demand requester object includes a minifilter associated with a filter manager in an I/O stack. The minifilter receives each I/O request from the application, references a table that includes at least one address where each data pack required to fulfill each I/O request is located, and determines if the data pack has been streamed to the system. The table may also include a size indicator for each data pack.

The minifilter loads before compression and filter minifilter drivers in the I/O stack. The minifilter attaches to the I/O stack by registering with a filter manager in the I/O stack for I/O requests for the application for which data is available in data packs for streaming delivery.

The minifilter passes on a read call if a required data pack is available locally and if all data in the required data pack has been received. The minifilter withholds a read call if a required data pack is not available locally or if all data in the required data pack has not been received.

The addresses in the table may include addresses for a local source such as a hard disk, an optical storage medium (e.g., CD or DVD), a nonvolatile memory (e.g., a flash RAM), or a magnetic storage medium (e.g., a diskette), and an address for at least one remote source for a second data pack such as a server (e.g., ftp and/or web server) and a peer computing device. The minifilter requests to retrieve a required data pack from a first source corresponding to a first address in the table if the data pack is available from the first source, and identifies an alternative address in the table if the data pack is not available from the first source.

If an I/O request is a write operation, the minifilter writes an address and size indicator corresponding to the write operation to the table, which may also indicate to a read operation that the data has already been delivered. If the I/O request is a create operation, the minifilter attaches extended data to a file stream.

An exemplary streaming on demand method includes installing an on-demand requester object on a computing device, the on-demand requester object being configured to receive I/O requests for an application for which data is available in data packs for streaming delivery, the on-demand requester object includes a minifilter associated with a filter manager in an I/O stack. The minifilter receives each I/O request from the application. The minifilter references a table that includes at least one address where each data pack required to fulfill each I/O request is located. The minifilter determines if the data pack required to fulfill each I/O request been streamed to the system. The minifilter attaches to the I/O stack by registering with a filter manager in the I/O stack for I/O requests for the application for which data is available in data packs for streaming delivery. The minifilter passes on a read call if a required data pack is available locally and if all data in the required data pack has been received. The minifilter withholds a read call if a required data pack is not available locally or if all data in the required data pack has not been received. The minifilter requests to retrieve a required data pack from a first source corresponding to a first address in the table if the data pack is available from the first source, and identifying an alternative address in the table if the data pack is not available from the first source.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to illustrate every embodiment of the invention. The invention is not limited to the exemplary embodiments depicted in the figures or the order of steps or types of components, configurations, ornamental aspects or proportions shown in the figures.

DETAILED DESCRIPTION

Figure 1:
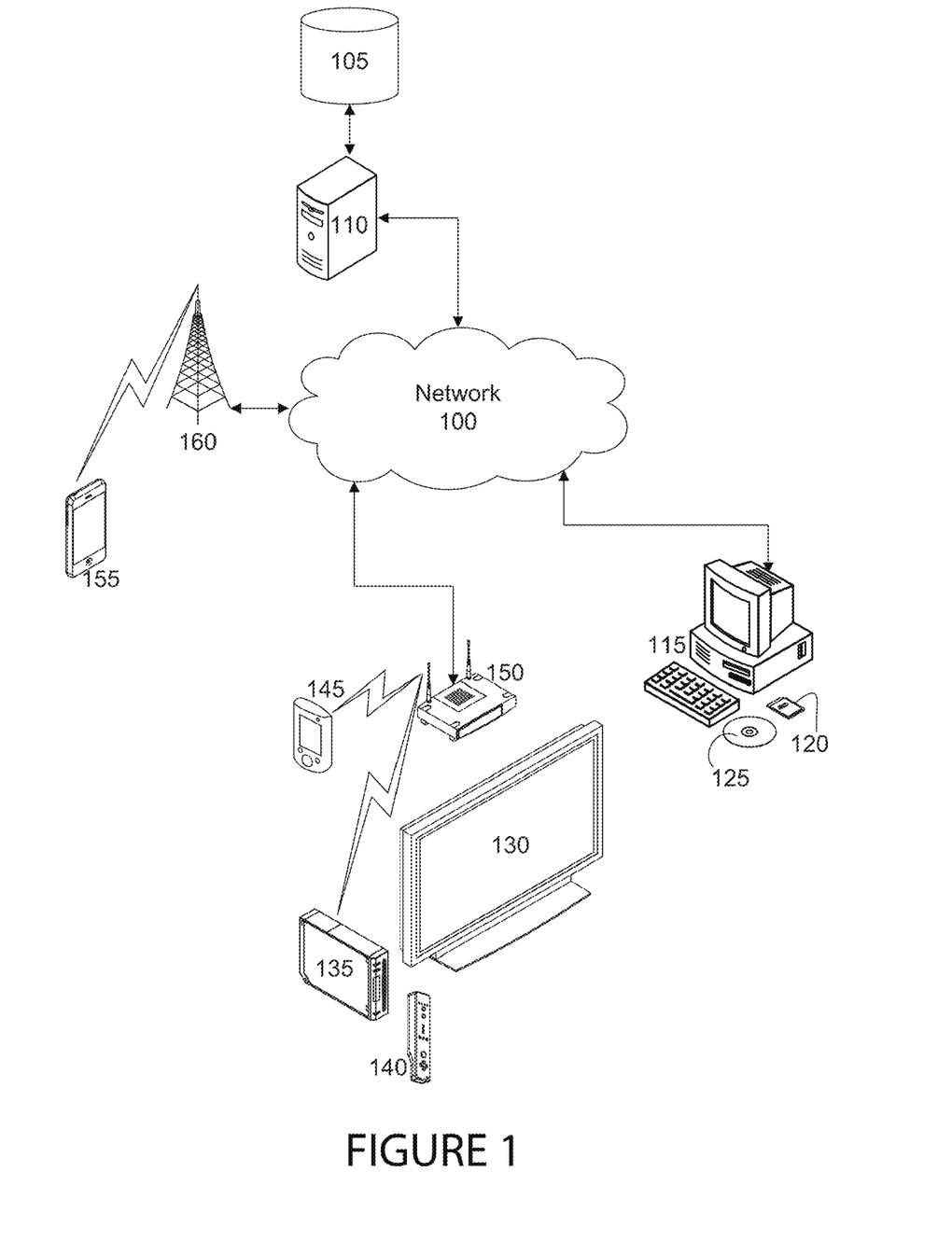
FIG. 1 is a high level block diagram of an environment for implementing an exemplary dynamic medium content streaming system in accordance with principles of the invention.

Referring to FIG. 1, a high level block diagram of an environment for implementing an exemplary dynamic medium content streaming system and methodology in accordance with principles of the invention is conceptually illustrated. Client devices may include virtually any computing devices with an operating system having a filter manager that communicates with a managed filter or minifilter configured to register for I/O requests contemplated by the methodology described herein and capable of receiving program data from a tangible medium or networked source. By way of example and not limitation, such client devices may include devices personal computers 115, handheld computers 145, microprocessor-based consumer electronics such as video game consoles 135 operably coupled to a television 130 or other display device and controlled by a controller 140, cellular telephones 155 particularly smart phones, and the like. The devices may connect to a network 100 via wired and/or wireless communication means, such as a wired or wireless router 150, access point, a cellular network 160 or other means for network communication coupling. A dynamic medium content streaming system and methodology in accordance with principles of the invention allows streaming from a data store 105 via a remote server 110 communicatively coupled to the network 100, but is not limited to streaming from a remote server 110. Instead, program data may be streamed from any accessible means for storing data, whether the means is remote, such as a server 110, or local, such as a storage medium 120, 125. Furthermore, program data may be streamed from any of a plurality of sources, including local and remote sources. Moreover, a dynamic medium content streaming system and methodology in accordance with principles of the invention allows streaming from several available sources for redundancy and load balancing.

Each client device includes an operating system that manages and coordinates activities and the sharing of the resources of the client device. The operating system architecture may include components that run in user mode and components that run in kernel mode. Programs and subsystems in user mode are limited in terms of what system resources they may access, while kernel mode provides unrestricted access to the system memory and external devices. An I/O manager in kernel mode translates user-mode I/O commands, such as read and write commands, into I/O request packets (IRPs). The I/O manager passes IRPs to a hierarchy of filter managers and managed filters (e.g., minifilters) and then to device drivers.

Each client device may further include one or more client applications configured to manage various actions. For example, client devices may include a media player application that is configured to enable an end-user to play and interact with streaming content.

The network 100 is configured to couple one computing device with another computing device to enable them to communication information. The network 100 is enabled to employ any form of computer readable media for communicating information from one computing device to another. Also, network 100 can include the Internet in addition to local area networks (LANs), wide area networks (WANs), direct connections, such as through a universal serial bus (USB) port, other forms of computer-readable media, or any combination thereof. In essence, network 100 includes any communication means allowing information to travel between one computing device and another computing device.

Figure 2:
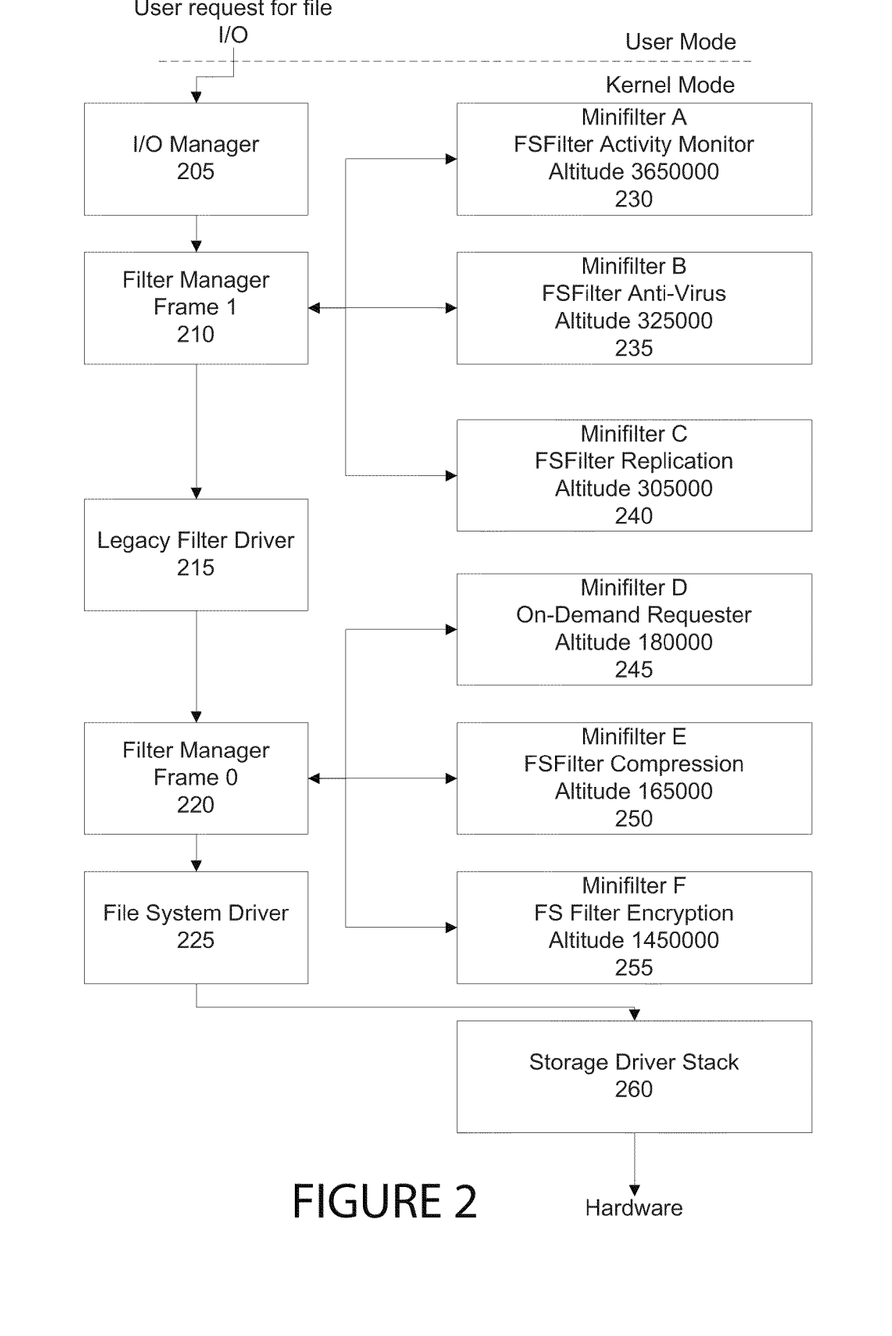
FIG. 2 is a high level flowchart of filter management aspects of an exemplary dynamic medium content streaming method in accordance with principles of the invention.

Turning now to FIG. 2, an exemplary I/O stack in which aspects of the subject matter described herein may operate is shown. The I/O stack shown is characteristic of a Windows® NT/Vista operating system. However, the invention is not limited to such windows operating systems. Instead, those skilled in the art will appreciate that the invention may be applied to any operating system that accommodates an inline service hook modifier that gets an address in a chain for another driver and then change a pointer to a filter or driver as described herein, and then provides a return pointer to the next device in a chain. The minifilter on-demand requester minifilter 245 described below is one example of a suitable an inline service hook modifier in accordance with principles of the invention.

The components of the I/O stack include an input/output (I/O) manager 205, a first filter manger 210 associated with a plurality of minifilters 230-240, a legacy filter driver, a second filter manger 220 associated with a plurality of minifilters 240-255 including an on-demand requester 245, which is unique to the subject invention, as described more fully below. A filter manager 210, 220 is a kernel-mode driver that exposes functionality commonly required in file system filter drivers. Each of the filter manager's filter device objects is called a frame 210, 220. A filter manager becomes active when a minifilter driver 230-255 is loaded. The filter manager 210, 220 attaches to the file system stack for a target volume. A managed filter (e.g., minifilter) driver 230-255 attaches to the file system stack indirectly, by registering with the filter manager 210, 220 for the I/O operations the minifilter driver chooses to filter. Minifilter drivers 230-255 attach in a particular order determined by a unique identifier called an altitude, which ensures that the instance of the minifilter driver is always loaded at the appropriate location relative to other minifilter driver instances, and it determines the order in which the filter manager calls the minifilter driver to handle I/O. Each filter manager frame 210, 220 represents a range of altitudes. The on-demand requester minifilter driver 245 is loaded before compression and filter minifilter drivers 250, 255, to avoid the complexity of decompression and decryption. The storage driver 260 stack manages access to disk interfaces. Requests to a disk interface are sent to the storage driver stack 260.

The filter manager simplifies processing I/O operations for minifilter drivers. Unlike a legacy filter driver, which must correctly pass all I/O requests to the next-lower driver and correctly handle pending requests, synchronization, and I/O completion whether or not the legacy filter driver does any work related to the request, a minifilter driver registers only for the I/O operations it must handle. For a given I/O operation, the filter manager calls only minifilter drivers that have registered a preoperation callback routine for that operation. A minifilter driver does whatever processing is needed for the I/O operation and indicates what should be done to the IRP by returning the appropriate value from its preoperation callback routine. A minifilter driver can modify parameters associated with an I/O operation and operation-specific parameters.

An application performing a dynamic medium content streaming methodology in accordance with principles of the invention may from time to time issue a file system request, for example by way of a function or method call, through an API to the I/O manager 205. The I/O manager 205 may then determine what I/O request or requests should be issued to fulfill the file system request and send each I/O request down the file system stack. The I/O manager 205 may also return data to the application as operations associated with the file system request proceed, complete, abort, or the like. From each I/O request, the filter manager 210, 220 may create a data structure (e.g., callback data) in a format suitable for use by the managed filters including minifilters 230-255. The filter manager 210, 220 may then call and pass the callback data or a reference to the callback data to each filter that has registered to receive a callback for the type of I/O received by the filter manager 210, 220. Any filter registered to receive callbacks for the type of I/O request received by the filter manager 210, 220 may be referred to as a registered filter. The filter manager 210, 220 passes callback data associated with a particular type of I/O request to each registered filter sequentially in order of altitudes, proceeding from lowest to highest.

A filter manager 210, 220 may be placed in a stack with legacy filters such as the filter 215. Each legacy filter 215 in the stack may process I/O requests and pass the requests to another filter or other component in the stack. For example, in response to a read request received from an application, the I/O manager 205 may send an I/O request to the filter 215, which in turn may examine the I/O request and determine that such I/O request is not of interest and thereafter pass the I/O request unchanged to the filter manager 220. If any registered minifilter is interested in the I/O request, the filter manager 220 may then pass callback data to such interested filter. After each interested registered filter has examined and acted on the callback data, the filter manager 220 may then pass the I/O request onward.

Advantageously, because the on-demand requester minifilter 245 only needs to address a certain subset of information for accurate performance, then as other filters, managers and drivers change and update, updates to them have no effect on the minifilter.

Figure 3A:
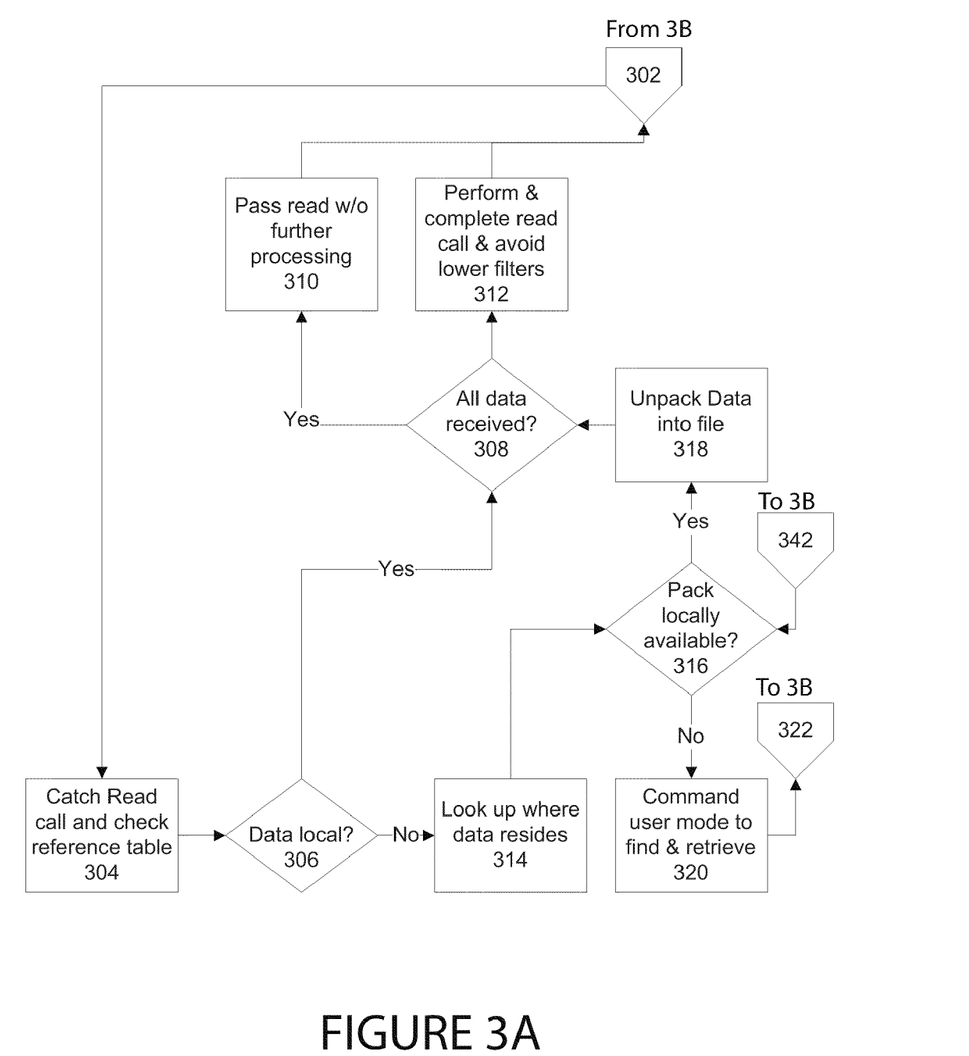
FIG. 3A is a high level flowchart of a first part of an exemplary dynamic medium content streaming method in accordance with principles of the invention.
Figure 3B:
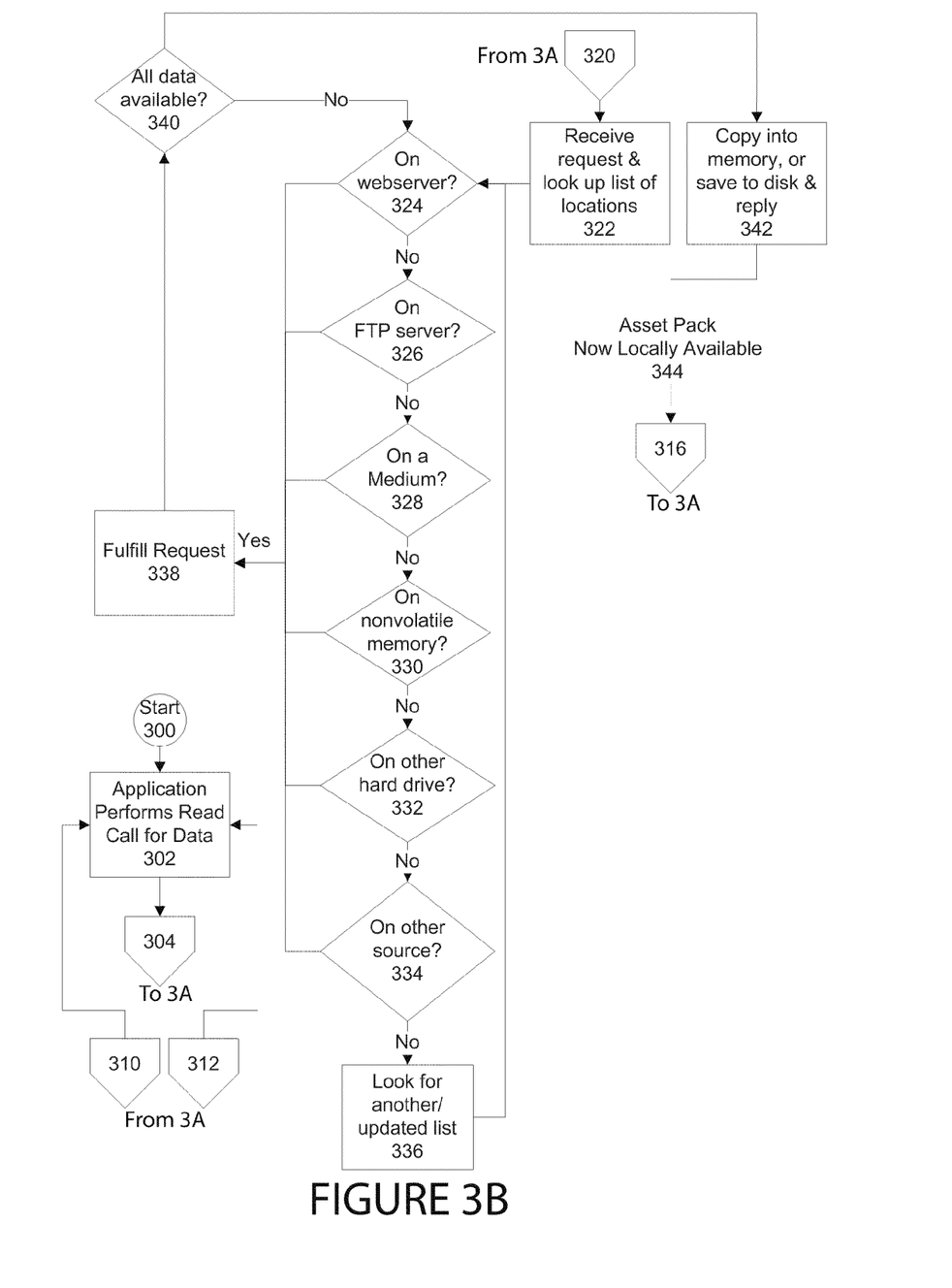
FIG. 3B is a high level flowchart of a second part of an exemplary dynamic medium content streaming method in accordance with principles of the invention.

Referring now to FIGS. 3A and 3B, a user mode application, such as (but not limited to) a media player or other software application, is executed, starting the exemplary process, as in step 300. The user mode application, which requires data (e.g., video, game or program data) to be provided (i.e., streamed) from a data source, generates a data request, namely a read call for data, as in step 305. The user mode loads an inline service hook modifier, such as the on-demand requester minifilter 245, which catches the read call and checks a local reference table for the data, as in step 304. The reference table, which may be loaded to the client device from a server or other data source, identifies each data pack, and may also include a size indicator, such as start and end offsets of the data pack. The reference table may also include an address for all data packs to indicate where a data pack may be retrieved. The reference table is not limited to a table structure, or even a single table. Instead, one or more local and/or remote reference sources may comprise a reference table. If the data pack is available locally on the client device, as in step 306, a determination is then made if all data in the pack has been received, as in step 308. If the complete data pack has been received, then the read call is passed on without any further processing to be completed by the minifilter 245. However, if the complete data pack has not been fully received, then the read call is not passed on to lower filters, as in step 312 and control proceeds back to the user mode application 302. The user mode application will reissue the read call until the data pack is available.

The location of each data pack required in response to a read call is looked up in the reference table, as in step 314. If the data pack is data pack is available locally, as determined in step 316, it is unpacked into an appropriate file, as in step 318. Otherwise, a command is sent to user mode code to find and retrieve the data pack, as in step 320.

Upon receiving a request for a data pack (aka "asset"), the user mode application looks up one or more media locations from a list, as in step 322. Such list of locations (i.e., addresses) may be part of the reference table or a separate list, file or other reference data source. By way of example and not limitation, the asset may be available from an accessible web server 324, ftp server 326, a CD or DVD 328, nonvolatile memory (e.g., flash media) 330, hard drive 332, and any other source 334. If no such source is identified or accessible, then the user mode application looks for another updated list, as in step 336, and returns control to step 322. If the asset is available from an accessible source, then a request to retrieve the asset is fulfilled, as in step 338, and receipt of the entire asset is confirmed, as in step 340. If any portion of the asset is unavailable from the targeted source, then control is passed to step 324 to identify another source. When the entire asset has been received, the user mode copies the data pack into memory or saves it to disk and replies back to the kernel mode, as in step 342. At step 344, the entire asset (i.e., data pack) is available locally and control is transferred to step 316. The asset is then unpacked, as in step 318, and made available for user mode access and use via step 310.

Figure 4:
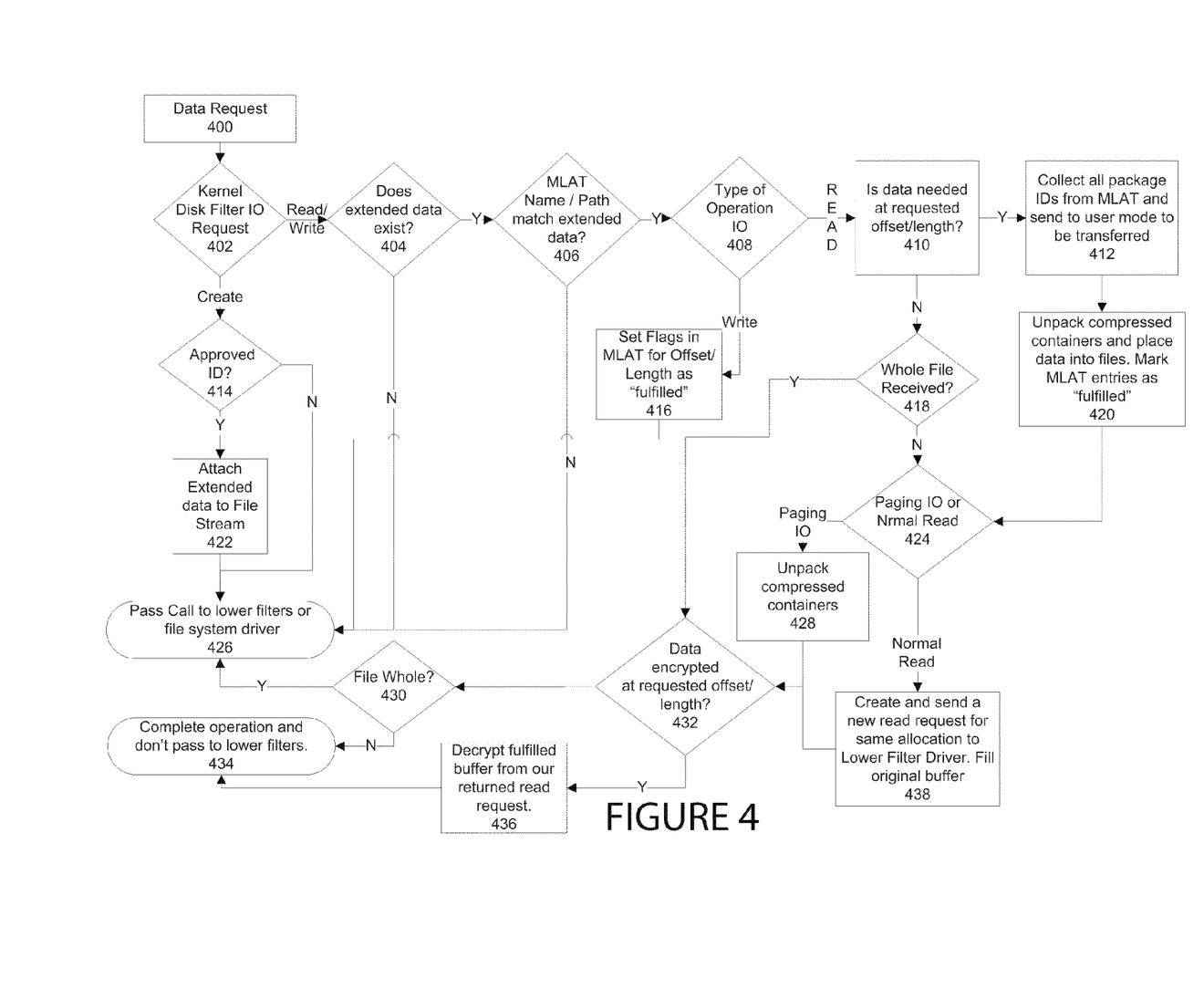
FIG. 4 is a high level flowchart of an exemplary method of processing data requests for a dynamic medium content streaming method in accordance with principles of the invention.

Referring now to the flowchart of FIG. 4, upon receiving an application data request as in step 400, the I/O stack determines the type of request in step 402. In the event of a read or write request, if the data pack exists, as determined by step 404, and the name and path of the data pack sought matches the name and address in the memory lookup audit table (MLAT), as in step 406. If the I/O operation is a read request, as determined in step 408, the minifilter determines if the required data pack is at the offset (location) and length (size) in step 410. Then the identification of each required data pack is determined from the MLAT and transferred to the user mode application, as in step 412. Compressed data packs are unpacked and placed into files, as in step 420, whereupon, MLAT entries are marked as fulfilled to indicate that the data packs have been made available to the user mode application. If in step 410, the required data is not available at the requested offset and length, then a determination is made if the entire data pack has been received in step 418. If it has been received, a determination is made if data is encrypted and at the requested offset and length, as in step 432. Encrypted available data is decrypted in step 436. Otherwise, a determination is made if the file is whole, as in step 430. If not, the operation is completed and control does not pass to lower filters, as in step 434. On the other hand, if the file is complete, the call is passed to the lower filters or file system driver, as in step 426. If the entire data pack has not been received, as determined in step 418, a determination is made if the call is a paging I/O or a normal read. Paging (sometimes called swapping) is the transfer of pages between main memory and an auxiliary store, such as hard disk drive, which allows use of disk storage for data that does not fit into physical RAM. In a paging I/O, compressed packs are unpacked into allocated paging memory buffers at missing offsets in step 428, and control proceeds to step 432. In a normal read I/O, a new read request is created and sent for the same allocation to a lower filter driver and the original buffer is filled, as in step 438. Again, control is then passed to step 432.

If the type of operation is a write operation as determined in step 408, then control passes to step 416. Flags are set in the MLAT for Offset and Length as "fulfilled" in step 416. This indicates where the data is located and how much data is included. Subsequently, control passes to step 426, where a call is passed to the lower filters or file system driver. Thus, in response to a write operation, an area is marked off as if it were delivered. Otherwise it could be corrupted if the original data was written over the area. Furthermore, a check may be performed as with a read call to ensure surrounding data is intact before the write. As an example, if data from 0 to 50000 does not exist and an asset pack covers from 0 to 1024, 1025 to 4096 and 4097 to 8192, then, in response to a write operation at 1000 to 5000, the system may then read and provide data from 0 to 1024 and data from 4097 to 8192 in place, and then allow it to overwrite 1000 to 5000. The entire region from 0 to 8192 may then be marked as received. This ensures the full integrity of the original file with an updated write call.

If the data request is a create operation as determined in step 402, then control passes to step 414. The process or thread ID is compared with a list of approved IDs in step 414. If the ID is approved, extended data is attached to the file stream, as in step 422. Otherwise, step 422 is bypassed and control passes to step 426, where a call is passed to the lower filters or file system driver.

Thus, an exemplary method according to principles of the invention, informs the on-demand requester minifilter 245 of an identifier for a program, i.e., a program ID (PID), and for all children spawned by the program, which are saved in a watch list. The on-demand requester minifilter 245 then watches for any requests made by the program as well as any children programs spawned. The demand requester minifilter 245 only watches PIDs in the watch list and no others. If a child program is spawned, the minifilter adds a PID for the child to the watch list.

As an illustrative example, an exemplary user mode application according to principles of the invention may launch an application such as a game. The demand requester minifilter 245 records a PID for the application into the watch list. The game may begin by playing a song, which is a sound clip that starts at offset 10,000 and is 200,000 bytes in length in a file called DATA.DAT with the whole file DATA.DAT being 20,000,000 bytes in length.

The game performs a read call on DATA.DAT starting at 10,000 for 200,000 bytes by invoking the operating system's call function, the kernel to be serviced, the IO manager and then the filter manager. Because the game PID is in the watch list, the filter manager will pass the read call to the demand requester minifilter 245. The demand requester minifilter 245 will recognize the PID and service the request.

Servicing the request entails several steps. First, the MLAT is referenced to determine if the byte region (e.g., DATA.DAT starting at 10,000 for 200,000 bytes) has already been serviced. If it has, a determination is made if the entire file has been completed. If it has been completed, the request is passed on to the next filter and processing continues in a normal manner. In such a case, the entire file including the byte region required by the game is available locally.

However, if the entire file has not been serviced, the demand requester minifilter 245 will send a new request to retrieve the data, copy it into the game's requesting buffer and complete the call. Filters and minifilters below the demand requester minifilter 245 will not be informed that the game requested the data as the call is completed and control is returned.

If the MLAT reflects that the region (e.g., DATA.DAT starting at 10,000 for 200,000 bytes) has not been serviced, a source (i.e., an asset container) that has the required data is cross referenced. If the container is local, the data will be copied into the destination file (DATA.DAT). If the container is not local, a list of assets needed to service the request will be sent to the user mode application, which will then proceed through a list of media locations 324-334 checking for the assets. Attempts to service each request may be made at any accessible source, such as a web server, FTP, P2P, hard disk, CD/DVD, flash memory, or any other form of medium that can store data. If only part of the data is found at one location, control will pass from location to location to retrieve all pieces of the data. Depending upon configuration and performance, accessible sources may be arranged in order of priority, with one or more sources being assigned a high priority or "preferred" status. As an example, if 400 MB of a 5 GB total game is stored on a game CD, and 3 GB is stored on a peer to peer network, and 1.6 GB is stored on a webserver, a system according to principles of the invention may summon each source to retrieve the data on demand. The data does not need to be together, it can be distributed in pieces and segments across many local and/or remote sources. By way of example and not limitation, part of a game (e.g., data for common sound effects, textures, game code, and the first 40 seconds of each video clip code) may be on a CD, while other data (e.g., data for landscape and dungeons) could be on a web server, with the rest of the foreign world data on an unpredictable peer to peer network. Thus, the invention allows seamless play with all or only a fraction of the data actually present in any one location. By distributing the data, cost benefits are shared across the media and sources.

When the data has been acquired, the user mode application signals the demand requester minifilter 245 in the kernel that it has fulfilled the request and the demand requester minifilter 245 then unpacks each asset container into a appropriate location. As one example, the demand requester minifilter 245 may fill the 200,000 bytes at the 10,000th offset. The bytes of data may be supplied from many (e.g., 15) smaller sources (e.g., containers of different sizes). The demand requester minifilter 245 updates its local table and releases the read command back to the game.

From the perspective of the game, the delay appears as a slow hard drive because there is no hooking or intervention with the game itself. The game program remains unchanged. There are no hooks into the game. The game is not modified. File system commands from the game are not altered. This facilitates integration of operation and preserves integrity and security of the game.

The invention provides means to deliver a package on any type of medium either singularly or dynamically requested by an identifier. The invention utilizes client side code that uses a server side component, kernel driver and a client component applet or application that accepts an identification tag as well as an initial source list. This component, called a "stub loader," controls operations to install and maintain accuracy/auditing of the delivered package. The on demand requester minifilter acts as a stub retrieval subsystem uniquely integrated into the I/O stack. When a stub is received via the stub retriever, the stub loader controls loading into the execution environment, thereby making the stub available for use and execution.

The delivered package itself may consist of smaller components of varying size and use depending on how it was prepared and how it may be requested. It may be a solid single source or a list of separate objects in a predetermined order at the same base location (e.g., 00001.zip, 00002.zip, 00003.zip . . . )

The stub loader reads the source list and interrogates the sources in order to determine if the available requested medium is available. The stub loader then checks the availability and readiness of the source and, if the source is available and ready, assigns it a preferred status for use. Optionally, a source may contain another source list called a "redirector list" which may contain a list of more sources of data. As an example, of a web URL in the source list may provide another source list that may be static or dynamic. A dynamic list may vary depending on where a request is coming from geographically (i.e., to support various languages) or to balance the network traffic in an open internet or closed corporate environment.

By way of example and not limitation, the stub loader may list four sources, such as a local CD with part of the data, a virtual drive, a P2P network, and a web url. The stub loader may then begin installing the package from the CD until it comes to a point where requested data is unavailable on the CD. The stub loader would then check the virtual drive to determine if the data is available. If it is available from the virtual drive, the stub loader may then resume installing the package from the virtual drive until it comes to a point where requested data is unavailable on the virtual drive. The stub loader would then check the P2P network to determine if the data is available. This process of checking and installing would repeat for each source, in the order specified, until the entire package is installed.

A streaming system according to principles of the invention relies upon a pre-structured package system that contains an organized object grouping. Each group may contain smaller portions of the original files in the media. The groups may be organized depending upon how and when the portions are used and the bandwidth consumed by the portion.

Assets (i.e., files or file portions) are broken up into three categories: Counted, Common and ETC. Counted assets are assets that have been tagged in a particular order for transfer, and may also refer to other counted assets to provide a dynamic loading tree that may change as the user operates the application. Common assets are objects that have been shared between multiple counted segments. In many cases, application operation will reuse the same sound, graphic, code or other resource in multiple instances. This allows for the media to be streamed with a counted object, but not be required to be streamed again from any medium. ETC objects are objects that were not accounted for, but are part of the software itself. These are things that may not be consumed in the normal operation, but exist with the package such as text files with release notes or for any other purpose that go with the package, but are not necessarily used by the package itself.

A kernel component according to principles of the invention provides a means to accomplish streaming without need to interface with the application (e.g., a game application). This provides an ability to take any package at any point and convert it into a streaming package while maintaining the original security, accountability and usability of the software itself. When the application requests a section of data, it makes standard calls into the operating system. These calls are ultimately converted to physical medium calls in the lower levels of the operating system known as the kernel. The demand requester minifilter 245 intercepts these read requests at the kernel level and determines if the package is requesting a section of data that has not been transferred (i.e., is not available locally). If it has been transferred, it will simply release and pass the call. If it has not been transferred, it will hold the read call, transfer the data from the source media, unpack and release the call. If the request is within an encrypted region, it will first make sure the data is available, then it will decrypt the return buffer to the asset in the kernel and release the call.

An important aspect of a process according to principles of the invention is that it does not require any virtual drive, device or the like. It works with the original hard drive and disk partition. Many application streaming systems and processes that currently exist facilitate streaming by using a virtual drive, file system driver or the like which are difficult to implement in compliance with security protocols and inefficient to maintain. In contrast, the subject invention uniquely uses a mini-filter, also known as a file system filter driver, i.e., an object that attaches to a file system driver and filters requests only. It does not generate or originate requests like a file system driver does. Consequently, in implementations of the subject invention, data is provided directly from the operating system hard drive partition, not a virtual file, redirector or the like. As an example, if a request is made on a windows based PC and the drive has NTFS loaded, it will make the request from the NTFS partition, not from a file virtually mounted as another partition or drive. This is important because DRM methods and systems typically reject virtual drives. Also, the overhead and virtual registry for a virtual drive are avoided. This allows for the underlying security methods of the operating system to stay in place such as windows security rights, access permissions and the like, versus using a virtual device which has its own set of rules within the mounted device itself.

In implementations of the subject invention, a package ID (i.e., an identifier for an application for which data is being streamed,) and the source list of where to acquire the content are provided. If no list is available locally, a system according to principles of the invention will query a server side component for the package ID and a list of sources where the data may be found. If the list is available, it will be provided, stored on the client side and invoked from there. Once the list is provided, a system according to principles of the invention will contact the source targets. When the target source is contacted, the system will first seek the ID's solid file structure, first asset object.

As an example, assume: ID=QU577612BR with sources of
    DISC: 0 and http://cdn.bitraider.com/
The system would seek the local CDROM/DVD/media drive.
    If the drive is at D:\, the system would look for D:\QU577612BR.BRP and http://cdn.bitraider.com/QU577612BR.BRP
If neither existed, it would then look for the assets contained inside of the solid file structure such as:
D:\QU577612BR__0000001.BAO or http://cdn.bitraider.com/QU577612BR__0000001.BAO, xxxx__0000002.BAO and so forth.

This allows the package to be stored in whole, or in pieces, and on different types of media and locations. Illustratively, a package may deliver assets 1, 2, 3 from a disk, 4, 5, 6 from a web service, 7,9,10 from a peer to peer network and 8 from a redirected URL to another server due to failure, corruption or missing object. Once a source medium is located, a header is requested. If it is not correct, the system will try another source. If it is correct, it will then stream the media to the client where it will be verified by a CRC32 check auditing table.

Once the object has passed the audit checking process, it will be sent to the decompressor to be inflated to its original segment size, and passed into the validator. The validator will check the integrity of the object to assure no corruption has occurred, and unpack it into the original segment slots of the original file names on the user's hard disk. There is no virtualization for stored files or registry information used in this process.

The client will queue any related common objects that are used with a counted object or requested object. It will then queue the next related counted object and repeat this process until all objects have been sent. Once they are completed, it will send over any ETC objects not accounted for. However, in the event the user performs a request of an object that has not been streamed, the kernel driver will determine the correct object needed, and send the request over to the client component to be fulfilled. When this occurs, the kernel will also hold and lock the application so that it may not perform any other read operations until the request has been fulfilled. Once the client has fulfilled the request, it will signal the kernel driver to unpack the medium to prevent internal conflict, in which the kernel will copy the regions of data in place, and release the request to the application itself. As far as the application is concerned, it appears to be a slow storage device request, and is not unreasonably held or given an error code in response.

In the event a package uses an encrypted segment or data block of a file, it will allow the operation system to read the data in, but will then intercept the buffer in memory and decrypt the data to be provided to the application itself, and flush the kernel buffer out of memory.

Advantageously, the system is completely transparent to the actual executable/program, and gives the appearance of a slow hard drive. No change is required to the application (e.g., a game program). Digital rights management feature included with an application remain intact.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

The invention claimed is:

1. A streaming on demand system comprising an on-demand requester object installed on a computing device, said on-demand requester object being configured to receive I/O requests on behalf of an application for which data is available in data packs for streaming delivery, said on-demand requester object being responsive to application I/O requests, said application I/O requests corresponding to sequential and non-sequential data packs, said data packs being portions of a complete data stream, said I/O requests determining an order in which data packs are sought for the application, said on-demand requester object comprising a minifilter associated with a filter manager in an I/O stack, said filter manager being configured to call the minifilter, said minifilter having a pre-operation callback routine for the I/O request registered with the filter manager, and said minifilter being configured to receive each I/O request from the application, said minifilter being further configured to reference a table that includes names and paths with at least one offset address and length where each data pack required to fulfill each I/O request is located, said minifilter being further configured to determine if the data pack has been streamed to the system, and said application being a program configured to use the data packs that fulfill each I/O request when the data packs are available on the computing device.

2. A streaming on demand system according to claim 1, said minifilter being configured to load before compression and filter minifilter drivers in the I/O stack.

3. A streaming on demand system according to claim 1, said minifilter attaching to the I/O stack by registering with a filter manager in the I/O stack for I/O requests for the application for which data is available in data packs for streaming delivery.

4. A streaming on demand system according to claim 1, said table including a size indicator for each data pack.

5. A streaming on demand system according to claim 1, said minifilter being configured to pass on a read call if a required data pack is available locally and if all data in the required data pack has been received.

6. A streaming on demand system according to claim 1, said minifilter being configured to withhold a read call if a required data pack is not available locally.

7. A streaming on demand system according to claim 1, said minifilter being configured to withhold a read call if all data in the required data pack has not been received.

8. A streaming on demand system according to claim 1, said at least one address including and address for at least one local source for a first data pack and an address for at least one remote source for a second data pack.

9. A streaming on demand system according to claim 1, said at least one address including and address for at least one local source for a first data pack, said local source being a source from the group consisting of a hard disk, an optical storage medium, a nonvolatile memory, a magnetic storage medium, and an address for at least one remote source for a second data pack.

10. A streaming on demand system according to claim 1, said at least one address including and address for at least one local source for a first data pack, and an address for at least one remote source for a second data pack, said remote source being a source from the group consisting of a server and a peer computing device.

11. A streaming on demand system according to claim 1, said minifilter being configured to request to retrieve a required data pack from a first source corresponding to a first address in the table if the data pack is available from the first source, and to
identify an alternative address in the table if the data pack is not available from the first source.

12. A streaming on demand system according to claim 1, said minifilter being configured, if the I/O request is a write operation, to mark an area as delivered and then write an address and size indicator corresponding to the write operation to the table.

13. A streaming on demand system according to claim 1, said minifilter being configured, if the I/O request is a create operation, to attach extended data to a file stream, said extended data corresponding to the create operation.

14. A streaming on demand method comprising installing an on-demand requester object on a computing device having an I/O manager, said on-demand requester object being configured to receive I/O requests from the I/O manager on behalf of an application for which data is available in data packs for streaming delivery, said on-demand requester object being responsive to application I/O requests, said application I/O requests corresponding to sequential and non-sequential data packs, said data packs being portions of a complete data stream, said I/O requests determining an order in which data packs are sought for the application, said on-demand requester object comprising a minifilter associated with a filter manager in an I/O stack, said filter manager being configured to call the minifilter, said minifilter having a pre-operation callback routine for the I/O request registered with the filter manager, and
said minifilter receiving each I/O request from the I/O manager, said minifilter referencing a table that includes names and paths with at least one offset address and length where each data pack required to fulfill each I/O request is located,
said minifilter determining if the data pack required to fulfill each I/O request been streamed to the system, and
said application using the data packs that fulfill each I/O request when the data packs are available on the computing device.

15. A streaming on demand method according to claim 14 further comprising attaching said minifilter to the I/O stack by registering with a filter manager in the I/O stack for I/O requests for the application for which data is available in data packs for streaming delivery.

16. A streaming on demand method according to claim 14 further comprising, said minifilter passing on a read call if a required data pack is available locally and if all data in the required data pack has been received.

17. A streaming on demand method according to claim 14 further comprising, said minifilter withholding a read call if a required data pack is not available locally.

18. A streaming on demand method according to claim 14 further comprising, said minifilter withholding a read call if all data in the required data pack has not been received.

19. A streaming on demand method according to claim 14, said at least one address including and address for at least one local source for a first data pack, said local source being a source from the group consisting of a hard disk, an optical storage medium, a nonvolatile memory, a magnetic storage medium, and
an address for at least one remote source for a second data pack, said remote source being a source from the group consisting of a server and a peer computing device.

20. A streaming on demand method according to claim 14, said minifilter requesting to retrieve a required data pack from a first source corresponding to a first address in the table if the data pack is available from the first source, and identifying an alternative address in the table if the data pack is not available from the first source.

* * * * *